United States Patent [19]

Kashiwa et al.

[11] Patent Number: 5,336,074

[45] Date of Patent: Aug. 9, 1994

[54] PRESSING SPEED CONTROLLER FOR HYDRAULIC PRESS

[75] Inventors: Masahiko Kashiwa; Masanobu Kurumaji, both of Kobe, Japan

[73] Assignee: Kabushiki Kaisha Kobe Seiko Sho, Kobe, Japan

[21] Appl. No.: 957,164

[22] Filed: Oct. 7, 1992

[30] Foreign Application Priority Data

Oct. 9, 1991 [JP] Japan .................. 3-262253

[51] Int. Cl.$^5$ .............................. B29C 45/80
[52] U.S. Cl. ................... 425/149; 264/40.5; 425/150
[58] Field of Search ............... 264/40.5; 425/135, 149, 425/150, 167

[56] References Cited

U.S. PATENT DOCUMENTS

| 3,752,363 | 8/1973 | Fegley et al. | 425/149 |
|---|---|---|---|
| 4,563,147 | 1/1986 | Langecker | 425/149 |
| 4,889,478 | 12/1989 | Sato | 425/149 |
| 5,071,603 | 12/1991 | Kurumaji et al. | 425/149 |

FOREIGN PATENT DOCUMENTS

| 2609434 | 9/1977 | Fed. Rep. of Germany . | |
| 2850741 | 5/1980 | Fed. Rep. of Germany . | |
| 3401203 | 1/1985 | Fed. Rep. of Germany . | |
| 2483841 | 12/1981 | France | 425/149 |
| 59-37302 | 2/1984 | Japan | 425/149 |
| 60-30323 | 2/1985 | Japan | 425/149 |
| 60-94320 | 5/1985 | Japan | 425/149 |
| 61-63428 | 4/1986 | Japan | 425/149 |
| 61-266217 | 11/1986 | Japan | 425/149 |
| 1560242 | 1/1980 | United Kingdom . | |

OTHER PUBLICATIONS

Ingenieur Digest, issue 3, vol. 10, Mar. 1971, p. 73, picture 37.
wt–Z. ind. Fertig., vol. 71, No. 2, 1981, p. 114.
Magazine Fluid, "Dauerlauf Mit Prop–Technik", Sep. 1988, pp. 37–39.
o+p "olhydraulik und pneumatik", vol. 30, No. 6, 1986.
o+p "olhydraulik und pneumatik", vol. 29, No. 10, 1985, p. 742.

Primary Examiner—Charles S. Bushey
Attorney, Agent, or Firm—Oblon, Spivak, McClelland, Maier & Neustadt

[57] ABSTRACT

A hydraulic press includes a fixed mold, a movable mold movable closely to or separately from the fixed mold, a hydraulic cylinder for moving and pressing the movable mold, and a hydraulic circuit for controlling the supply of a pressing oil in the hydraulic cylinder. The hydraulic circuit includes: a variable capacity pump connected to the hydraulic cylinder by an oil tube through a solenoid direction switching valve; a solenoid proportional flow control valve interposed on the way of an oil tube bypassing the solenoid direction switching valve; a detecting sensor for detecting the position or speed of the movable mold; a speed setter for setting the pressing speed of the movable mold; and a controller for comparing the output value of the detecting sensor with a speed set-up value thereby adjusting the opening of the solenoid proportional flow control valve. With this construction, it is possible to smoothly control the pressing speed in a low speed pressing region of the movable mold irrespective of the leaked oil amount and load on the pressing cylinder side.

1 Claim, 3 Drawing Sheets

- $t_1$ : NO LOAD DESCENDING TIME
- $t_2$ : PRE-LOAD DESCENDING TIME ⎫ CHARGING TIME
- $t_3$ : PRESSING DESCENDING TIME ⎭
- $t_4$ : PRESSURE CONTROL TIME (PRESSING TIME)
- $t_5$ : SEPARATING TIME
- $t_6$ : ASCENDING TIME

PRESSING SPEED CONTROLLER FOR HYDRAULIC PRESS

BACKGROUND OF THE INVENTION

1. Field of the Invention

The present invention relates to a pressing speed controller for a hydraulic press for compression-molding a substance to be molded.

2. Description of the Related Arts

In manufacturing a substance to be molded, for example, a front panel, a body panel or the like of an automobile by compression-molding a thermosetting resin made seat material, that is, a SMC (Sheet Molding Compound) or FRP, there has been used such a hydraulic press as shown in FIG. 2.

A press 40 includes a base 41; uprights 42 erected on the base 41; a crown 43 provided on the upper portions of the uprights 42; a hydraulic cylinder 44 provided on the crown 43; a slide 46 supported at the lower end of a plunger 45 of the hydraulic cylinder 44 and guided by the uprights 42 so as to be movable up and down; a fixed mold 47 exchangeably fixed on the upper surface of the base 41; a movable mold 48 exchangeably mounted on the lower surface of the slide 46; an oil tank 50 for supplying a working oil to the hydraulic cylinder 44 through an oil filler valve 49; and a hydraulic circuit 51 for controlling the supply of a pressing oil.

The above hydraulic circuit 51 includes a variable capacity pump 54 connected to the hydraulic cylinder 44 by an oil tube 53 through a solenoid proportional flow control valve 52; a pressing speed setting means 55 and an amplifier 56, and a relief valve 57 provided between the pump 54 and the valve 52.

This hydraulic circuit 51 functions to change the opening of the solenoid proportional flow control valve 52 in proportion with the pressing speed set by the setting means 55.

Namely, as shown in FIG. 3, in the whole stroke extending from the descending to the ascending of the position of the slide 46, that is, the movable mold 48, the descending speed of the plunger 45 of the hydraulic cylinder 44 is controlled in a multi-stage for the times ($t_1$, $t_2$, $t_3$) when the movable mold 48 is descended from the top dead point and the clamping is completed. In the above, conventionally, there has been performed an open loop control for controlling the pressing descending speed at the period of $t_3$ (charging time) shown in FIG. 3 by changing the opening of the solenoid proportional flow control valve 52 in proportion with the above setting.

However, the above conventional technique has the following disadvantage: Namely, in a low speed pressing descending region $t_3$ (2 mm/sec or less), when a load pressure (resin pressure) is increased with respect to the oil amount controlled by the solenoid proportional flow control valve 52 for controlling the pressing speed of the movable mold 48, that is, the plunger 45 (open loop), the amount of oil leaked from the hydraulic cylinder side 44 (the oil filler valve 49, sub-cylinder, oil valve and the like) is increased. Consequently, the real descending speed is made slow with respect to the setting speed, and further, is not increased up to the set-up pressure of a pressure change-over switch thereby obstructing the change-over from the pressing speed control to the pressure control.

SUMMARY OF THE INVENTION

Taking the above circumstances into consideration, the present invention has been made, and an object is to provide a pressing speed controller capable of controlling a pressing speed irrespective of the leaked oil amount and the load (resin pressure) on a pressing cylinder side in a low speed pressing region of a movable mold.

To achieve the above object, in a preferred mode of the present invention, there is provided a hydraulic press including a fixed mold, a movable mold movable closely to or separately from the fixed mold, a hydraulic cylinder for moving and pressing the movable mold, and a hydraulic circuit for controlling the supply of a pressing oil in the hydraulic cylinder, the improvement wherein the hydraulic circuit comprises: a variable capacity pump connected to the hydraulic cylinder by an oil tube through a solenoid direction switching valve; a solenoid proportional flow control valve interposed on the way of an oil tube bypassing the solenoid direction switching valve; a detecting sensor for detecting the position or speed of the movable mold; a speed setting means for setting the pressing speed of the movable mold; and a control means for comparing the output value of the detecting sensor with a speed set-up value thereby adjusting the opening of the solenoid proportional flow control valve.

According to the present invention, as the movable mold is descended, the output signal from the position detecting sensor is compared with the speed set-up signal, and on the basis of the compared electric signal, the opening of the solenoid proportional flow control valve is controlled (closed loop).

When the movable mold reaches the low speed pressing descending region after high speed descending, the solenoid direction switching valve is closed, and the oil discharged from the variable capacity pump is adjusted in the following: namely, in the case that the detected value outputted from the position detecting sensor is small as compared with the set-up value of the speed setting means, the opening of the solenoid proportional flow control valve is immediately enlarged, so that the amount of the oil supplied to the hydraulic cylinder is increased for increasing the descending speed of the movable mold.

Thus, the present invention makes it possible to control the pressing speed of the movable mold timely and smoothly in correspondence with the real speed irrespective of the leaked oil amount on the hydraulic cylinder side in the low speed descending region of the movable mold and the load (resin pressure) during pressing descending, and hence to suitably perform the pressing and smoothly switch the pressing speed control to the pressure control.

DETAILED DESCRIPTION OF THE PREFERRED EMBODIMENTS

Figure 1:
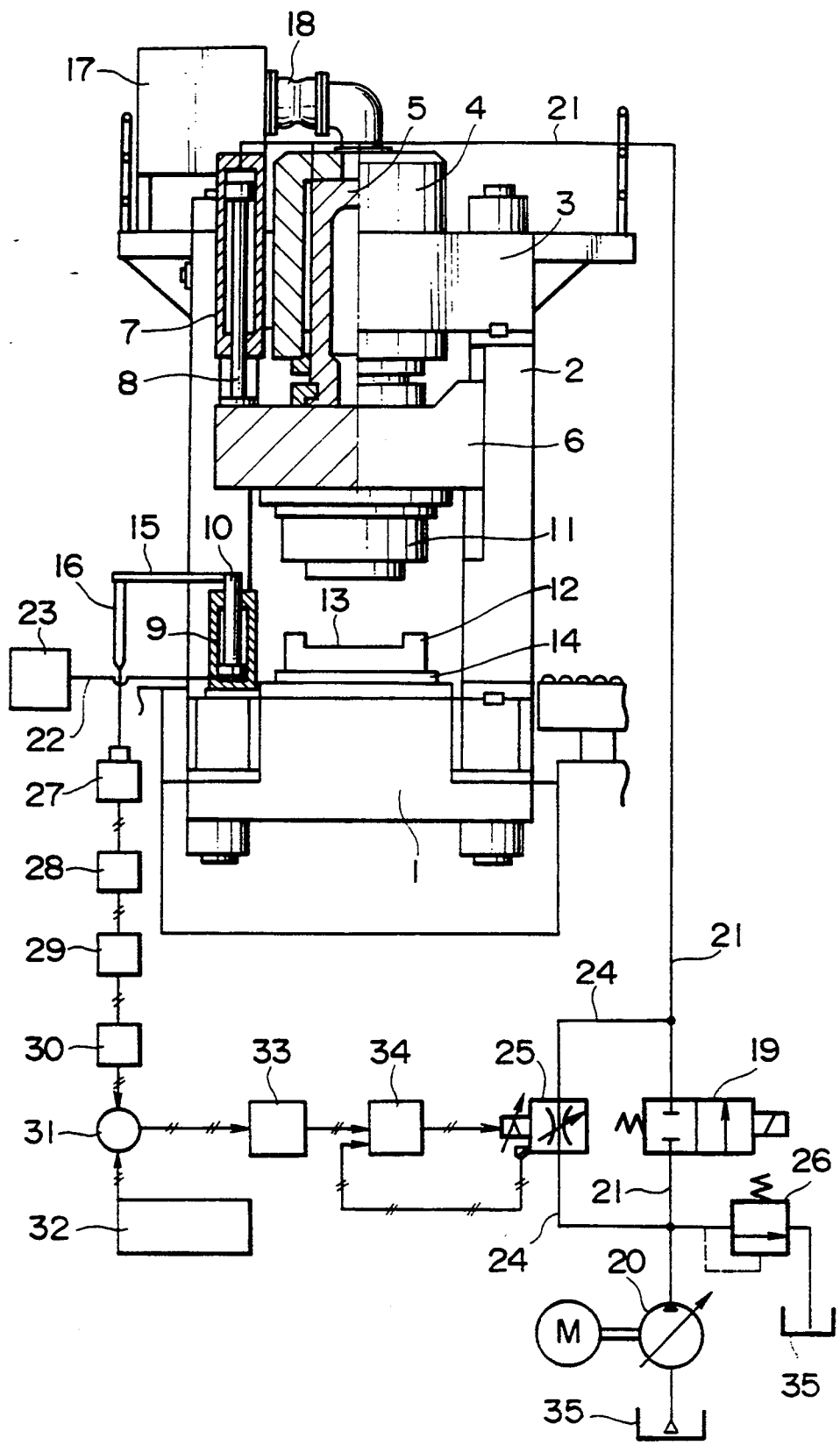
FIG. 1 is a front view partially broken showing one embodiment of the present invention.
Figure 2:
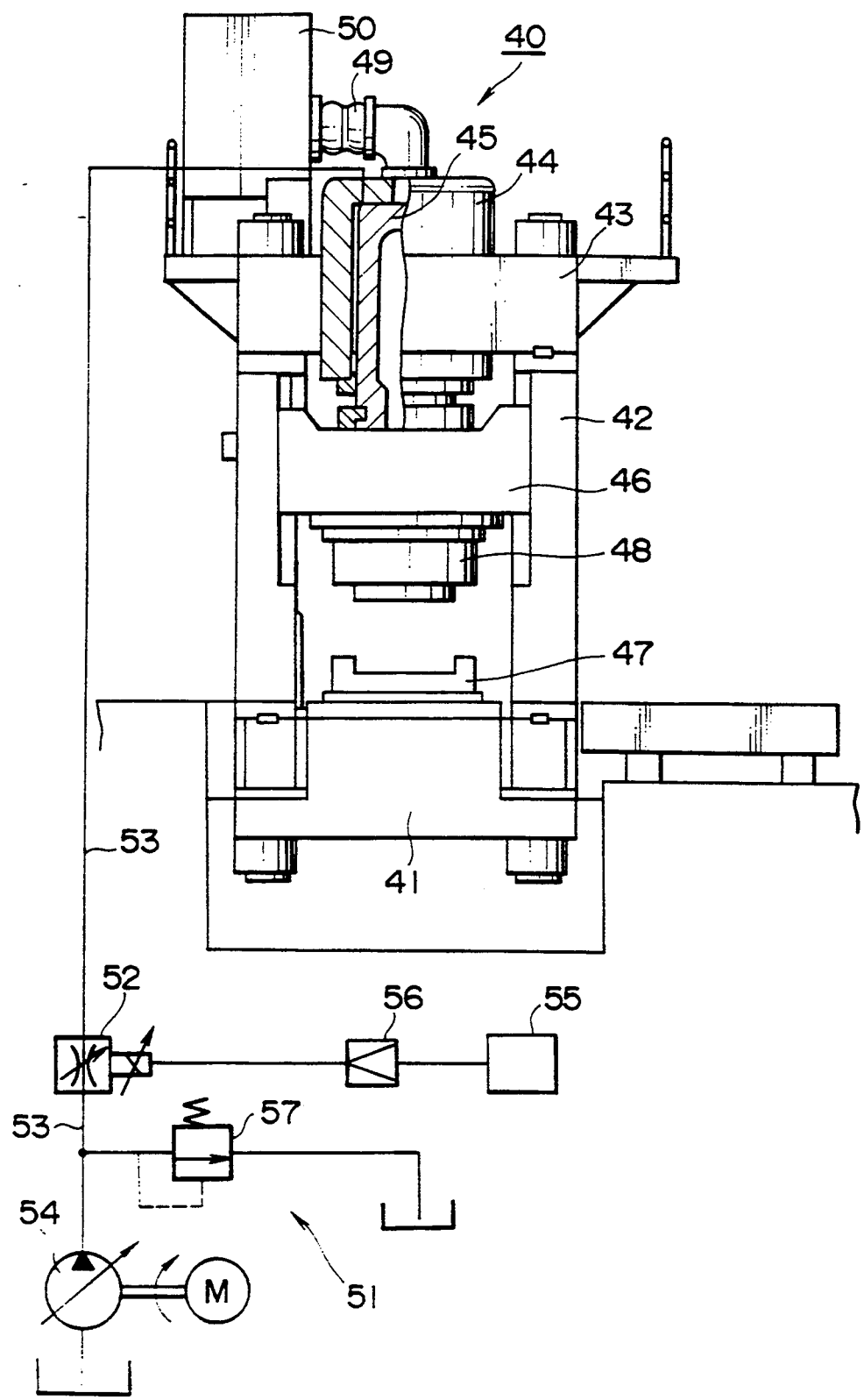
FIG. 2 is a front view partially broken showing the conventional example.
Figure 3:
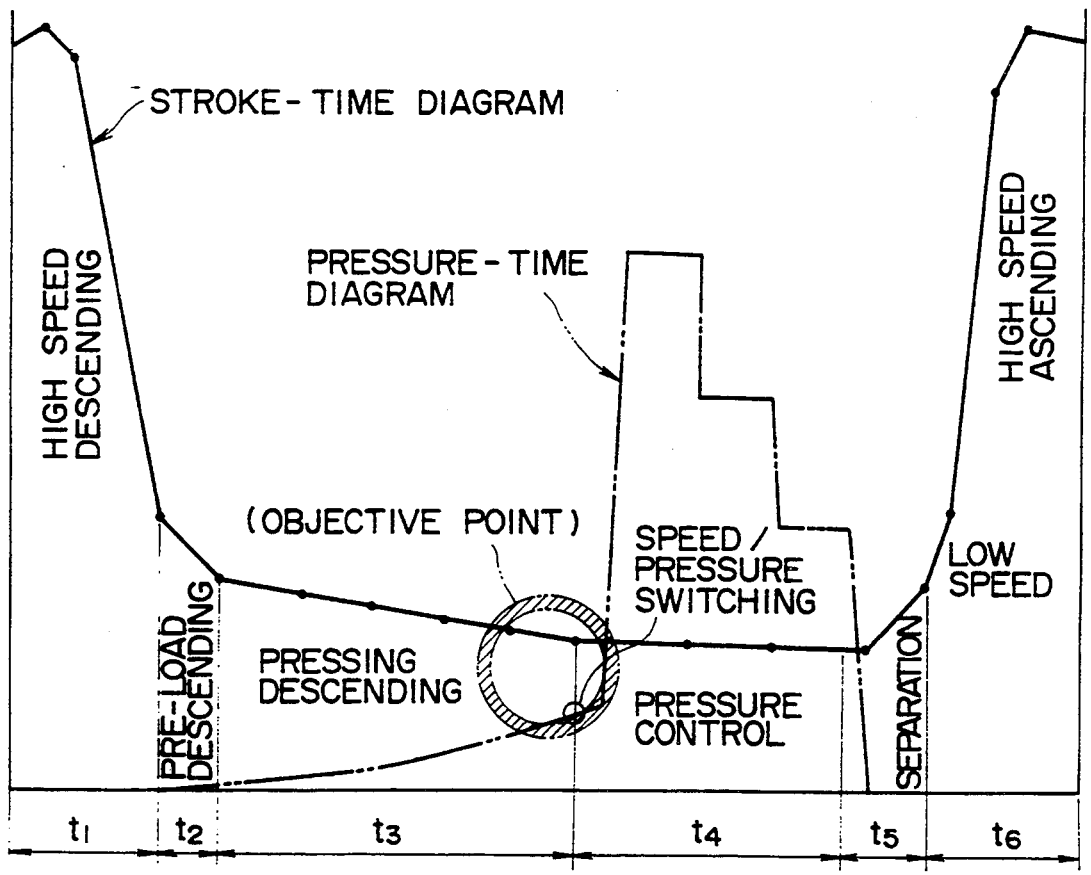
FIG. 3 is a graph showing a conventional example being multi-stage controlled.

FIG. 1 shows an embodiment of a hydraulic press for compressing a SMC, which includes a bed 1 fixed on a floor, uprights 2 erected at four corners of the bed 1, and a crown 3 for connecting and fixing the upper ends of the uprights 2 to each other. A single acting hydraulic cylinder 4 is mounted at the central portion of the crown 3, and the lower end of a plunger 5 of the cylinder 4 projects downwardly from the crown 3 to be connected to a slide 6.

The slide 6 is guided so as to be movable up and down by the uprights 2. Also, double-acting sub-cylinders 7 are provided on the right and left sides of the crown 3, and piston rods 8 of the sub-cylinders 7 are connected to the slide 6.

Leveling cylinders 9 are provided at four corners, respectively. The upper end surface of a piston rod 10 of each cylinder 9 is intended to be separatively abutted on the lower surface of the slide 6.

A movable mold 11 is removably mounted on the lower surface of the slide 6, and a fixed mold 12 is removably mounted on the upper surface of the above bed 1 in correspondence to the movable mold 11. When both the molds 11 and 12 are clamped, a cavity 13 is formed between the mating portions thereof. The fixed mold 12 houses a pressure detecting sensor 14 for detecting a pressure in the cavity 13.

A position detecting sensor 16 for detecting the position of the movable mold 11 is mounted on the upper portion of the piston rod 10 of each leveling cylinder 9 through an arm 15. The position detecting sensor 16 detects the position and moving speed (pressing speed) of the movable mold 11 during a period until the slide 6 is separated from the upper end surface of the piston rods 10 immediately after the slide 6 is abutted thereon.

An oil tank 17 is mounted on the crown 3, and the tank 17 is connected to the hydraulic cylinder 4 through an oil filler valve 18. The hydraulic cylinder 4 is connected to the sub-cylinders 7 by the variable capacity pump 20 and the oil tube 21 through a solenoid direction switching valve 19. In addition, the leveling cylinders 9 are connected to a leveling hydraulic unit 23 through the oil tube 22.

The oil tube 21 is connected to a bypass tube 24 for bypassing the solenoid direction switching valve 19 through a solenoid proportional flow control valve 25, and a relief valve 26 is connected between the discharge side of the variable capacity pump 20 and the solenoid direction switching valve 19.

Numeral 27 indicates a detector for receiving the output of the position detecting sensor 16; 28 is a D/A converter; 29 is an isolator; 30 is a converter; and 31 is a comparator. These are electrically connected to each other. The comparator 31 is connected to an input key board for setting the pressing speed, that is, a speed setting means 32. In the comparator 31, the value of a speed based upon the output of the position detecting sensor 16 inputted therein is compared with the speed set-up value. The result is inputted from the comparator 31 to the solenoid proportional flow control valve 25 as an electric signal through a PID controller 33 and a servo-amplifier 34. Thus the opening of the control valve 25 is controlled (closed loop). In addition, the actuation of the solenoid proportional flow control valve is fed-back in the servo-amplifier 34.

In this embodiment, FIG. 1 shows a start state where the slide 6 lies at the top dead point. In such a state, a SMC material is charged in the cavity 13 of the fixed mold 12 located on the lower side. Subsequently, the slide 6 is rapidly descended, and a working oil is supplied from the variable capacity pump 20 to the hydraulic cylinder 4 and the sub-cylinders 7 through the solenoid direction switching valve 19. At this time, the oil in the sub-cylinder 7 on the rod side is returned to the oil tank 35.

As the slide 6 comes closer to the upper ends of the piston rods 10 of the leveling cylinders 9, the descending speed of the slide 6 is moderated. Next, when the upper ends of the piston rods 10 are abutted on the lower surface of the slide 6, the positional detection of the slide 6, that is, the movable mold 11 is started by the sensor 16. Thus, in the low speed pressing region, the solenoid direction switching valve 19 is closed, so that the pressure oil discharged from the variable capacity pump 20 is supplied from the oil tube 21 so as to bypass the solenoid proportional flow control valve 25 controlled in its opening such that the slide 6 is descended at the set-up speed inputted from the speed setting means 32, and the bypass tube 24.

Next, the comparator 31 compares the output of the position and speed of the slide 6, that is, the movable mold 11 detected by the position detecting sensor 16 with the input of the set-up speed at the setting means 32. When the output value of the real speed is lower than the set-up value, the opening of the solenoid proportional flow control valve 25 is immediately increased, so that the amount of the oil supplied to the cylinders 4 and 7 thereby controlling the pressing descending speed at the set-up speed.

When the clamping between the movable mold 11 and the fixed mold 12 is thus completed, and the SMC material is filled in the cavity 13 and pressed at the specified pressure, the compression is carried out by changing the speed control into the pressure control while keeping the pressures in the molds 11 and 12 at the specified values respectively.

After completion of the compression, the slide 6 is slightly ascended after a pressure-relief process, after which the in-mold coat is carried out. Next, oil is supplied to the sub-cylinders 7 on the cylinder and rod sides to thus become the free state, so that the oil in the hydraulic cylinder 4 is allowed to flow in the oil tank 17 through the oil filler valve 18. Thus, after completion of the compression including the in-mold coat, the slide 6 is ascended to the top dead point by the sub-cylinders 7.

The present invention is not limited to the above embodiment. For example, the position detecting sensor may include a rotary encoder or linear encoder for detecting the whole stroke of the movable mold in place of the leveling cylinder, and further, a sensor for directly detecting the pressing speed in place of the positional detection.

As described above, according to the present invention, it is possible to control the pressing speed of the movable mold timely and smoothly in correspondence with the real speed irrespective of the leaked oil amount on the hydraulic cylinder side in the low speed descending region of the movable mold and the load (resin pressure) during pressing descending, to suitably perform the pressing and smoothly switch the pressing speed control to the pressure control, and to secure the strength and dimensional accuracy required for moldings.

What is claimed is:

1. A hydraulic press including a fixed mold, a movable mold movable toward and away from said fixed mold, a hydraulic cylinder for moving and pressing said movable mold, and a hydraulic circuit for controlling a supply of a pressing oil in said hydraulic cylinder, wherein said hydraulic circuit comprises:

a variable capacity pump connected to said hydraulic cylinder via a first oil tube and a solenoid direction switching valve;

a second oil tube bypassing said solenoid direction switching valve;

a solenoid proportional control valve disposed in said second oil tube for controlling a flow of oil therethrough;

means for determining a speed of said movable mold;

a speed setting means for setting a pressing speed of said movable mold; and a control means for comparing an output value of said determining means with a speed set-up value and for adjusting an opening of said solenoid proportional flow control valve based on said comparison.

* * * * *